United States Patent
Nakanishi et al.

(10) Patent No.: US 9,956,901 B2
(45) Date of Patent: May 1, 2018

(54) AUTOMOTIVE HEADLAMP APPARATUS HAVING SWIVEL FUNCTION OF LAMP UNIT

(75) Inventors: Yutaka Nakanishi, Shizuoka (JP); Manabu Sasa, Shizuoka (JP); Atsushi Yamazaki, Shizuoka (JP)

(73) Assignee: KOITO MANUFACTURING CO., LTD., Shizuoka (JP)

( * ) Notice: Subject to any disclaimer, the term of this patent is extended or adjusted under 35 U.S.C. 154(b) by 1050 days.

(21) Appl. No.: 12/845,408

(22) Filed: Jul. 28, 2010

(65) Prior Publication Data

US 2011/0025209 A1    Feb. 3, 2011

(30) Foreign Application Priority Data

Jul. 29, 2009   (JP) ................................. 2009-176918

(51) Int. Cl.
*B60Q 1/00*     (2006.01)
*B60Q 1/14*     (2006.01)
(Continued)

(52) U.S. Cl.
CPC ............... *B60Q 1/143* (2013.01); *B60Q 1/12* (2013.01); *F21S 48/1794* (2013.01);
(Continued)

(58) Field of Classification Search
CPC ........ B60Q 1/0425; B60Q 1/143; B60Q 1/06; B60Q 1/12; B60Q 2300/056;
(Continued)

(56) References Cited

U.S. PATENT DOCUMENTS

| | | | |
|---|---|---|---|
| 2001/0043474 A1* | 11/2001 | Kusagaya ..................... | 362/466 |
| 2007/0195543 A1* | 8/2007 | Sugimoto et al. ............ | 362/509 |
| 2008/0043486 A1* | 2/2008 | Suzuki ................ | F21S 48/1186 |
| | | | 362/539 |

FOREIGN PATENT DOCUMENTS

DE    10 2007 045 150 A1    4/2008
DE    10 2007 028 658 A1    12/2008
(Continued)

OTHER PUBLICATIONS

Chinese Office Action, dated Jun. 25, 2012, 6 pages.
(Continued)

*Primary Examiner* — Andrew Coughlin
*Assistant Examiner* — Fatima Farokhrooz

(57) ABSTRACT

A curvature estimation unit estimates the curvature of the road on which a vehicle is driving. A swivel angle setting unit is configured to perform a first mode in which a swivel angle of a lamp unit is set such that a light distribution pattern follows the travelling direction of the vehicle based on the curvature estimated by the curvature estimation unit, and perform a second mode in which a swivel angle of the lamp unit is set such that a shielded area created in a light distribution pattern follows the position of the vehicle detected by a vehicle position detector. A pattern determination unit determines a light distribution pattern such that the position of the vehicle detected by the vehicle position detector remains in the shielded area. A swivel angle setting unit performs the first mode when it is determined that the road is a curved road based on the curvature estimated by the curvature estimation unit, and performs the second mode when it is determined that the road is a straight road.

20 Claims, 12 Drawing Sheets

(51) Int. Cl.
*B60Q 1/12* (2006.01)
*F21S 8/10* (2006.01)

(52) U.S. Cl.
CPC .. *B60Q 2300/056* (2013.01); *B60Q 2300/322* (2013.01); *B60Q 2300/41* (2013.01); *B60Q 2300/42* (2013.01); *B60Q 2300/45* (2013.01)

(58) Field of Classification Search
CPC .......... B60Q 2300/322; B60Q 2300/00; B60Q 2300/41; B60Q 2300/42; B60Q 2300/45; F21S 48/1794
USPC ..... 362/460, 464–467, 529–532, 43, 44, 39, 362/49
See application file for complete search history.

(56) References Cited

FOREIGN PATENT DOCUMENTS

| | | |
|---|---|---|
| DE | 10 2007 038 077 A1 | 2/2009 |
| DE | 10 2008 060 949 A1 | 9/2009 |
| EP | 2 103 868 A2 | 9/2009 |
| EP | 2 156 983 A1 | 2/2010 |
| JP | 2008-094127 | 4/2008 |
| WO | 2009/039882 A1 | 4/2009 |

OTHER PUBLICATIONS

European Search Report for Application No./Patent No. 10171202.4 / 2423 / 2279908 dated Jun. 20, 2011.
EPO, Office Action in counterpart European Application No. 10171202.4 dated Feb. 5, 2013.
Office Action dated Sep. 6, 2013, by the European Patent Office in corresponding European Patent Application No. 10171202.4. (6 pages).
Extended Search Report dated Sep. 12, 2013, by the European Patent Office in corresponding European Patent Application No. 13173204.2 (7 pages).
Extended Search Report dated Sep. 12, 2013, by the European Patent Office in corresponding European Patent Application No. 13173206.7 (7 pages).
Communication Pursuant to Article 94(3) EPC dated Oct. 14, 2016 by the European Patent Office in corresponding European Patent Application No. 13173206.7 (7 pages).
Communication Pursuant to Article 94(3) EPC dated Sep. 22, 2015 by the European Patent Office in corresponding European Patent Application No. 13173204.2 (3 pages).
Communication Pursuant to Article 94(3) EPC dated Sep. 22, 2015 by the European Patent Office in corresponding European Patent Application No. 13173206.7 (5 pages).

* cited by examiner

FIG.5

| DESCRIPTION | RESPECTIVE INDIVIDUAL LIGHT DISTRIBUTION PATTERNS | SYNTHESIZED LIGHT DISTRIBUTION PATTERN |
|---|---|---|
| (a) USUAL LOW BEAM | LoL / LoR | LoC |
| (b) LEADING VEHICLE IS NOT PRESENT. ONCOMING VEHICLE IS PRESENT. | HiL / LoR | HiCL |
| (c) LEADING VEHICLE IS PRESENT. ONCOMING VEHICLE IS NOT PRESENT. | LoL / HiR | HiCR |
| (d) HIGH BEAM | FL / FR | HiC |

AUTOMOTIVE HEADLAMP APPARATUS HAVING SWIVEL FUNCTION OF LAMP UNIT

CROSS-REFERENCE TO RELATED APPLICATION

This application is based upon and claims the benefit of priority from the prior Japanese Patent Application No. 2009-176918, filed on Jul. 29, 2009, the entire content of which is incorporated herein by reference.

BACKGROUND OF THE INVENTION

1. Field of the Invention

The present invention relates to an automotive headlamp apparatus comprising a swivel mechanism swiveling the direction of a light distribution of a lamp unit to right and left.

2. Description of the Related Art

Automotive headlamp apparatuses comprising swivel mechanisms swiveling the directions of light distributions of lamp units to right and left, have been conventionally known. In such an automotive headlamp apparatus, a lamp unit is mounted in a manner in which the lamp unit can be swiveled to right and left relative to a lamp body with the swivel axis of the lamp unit being pivotally supported by a bracket and the bracket being fixed to the lamp body.

An Adaptive Front-lighting System (AFS) has been proposed in which the illumination direction of a headlamp can be changed so as to illuminate, while driving on a curved road, the travelling direction of a vehicle by using the swivel mechanism. Further, in Japanese Patent Publication Application No. 2008-94127 and DE 10 2007 045 150, an ADB (Adaptive Driving Beam) system has been proposed in which glare is prevented by changing the illumination direction of high beam so as to exclude a leading vehicle by detecting the leading vehicle with an image photographed by a camera being processed.

Each of the aforementioned AFS and ADB is effective when a vehicle is in a particular state. However, if both systems are mounted in a vehicle, illumination direction angles (the angle is referred to as a "swivel angle") of a headlamp in both the systems are sometimes different from each other. In such a case, it becomes a problem which angle should be adopted.

SUMMARY OF THE INVENTION

The present invention has been made in view of the aforementioned problem, and a purpose of the invention is to provide a technique for adjusting both systems of the AFS and the ADB in an automotive headlamp apparatus having a swivel mechanism of a lamp unit.

An embodiment of the present invention is an automotive headlamp apparatus. The apparatus comprises: lamp units that are arranged on both sides in the vehicle width direction of a vehicle so as to be spaced apart from each other, each of which is configured to be capable of forming at least a light distribution pattern for low beam and a light distribution pattern for shielded high beam, the light distribution pattern for shielded high beam having a shielded area above the horizontal line and on the side opposite to the position where the lamp unit is arranged; a lamp drive unit configured to respectively swivel the lamp units to approximately the right and left directions of the vehicle; a curvature estimation unit configured to estimate the curvature of the road on which the vehicle is driving; a vehicle position detector configured to detect the position of a forward vehicle; a swivel angle setting unit configured to be able to perform a first mode in which a swivel angle of the lamp unit is set such that a light distribution pattern follows the travelling direction of the vehicle based on the curvature estimated by the curvature estimation unit, and perform a second mode in which a swivel angle of the lamp unit is set such that a shielded area created in a light distribution pattern follows the position of the vehicle detected by the vehicle position detector; a swivel controller configured to control the lamp drive unit in accordance with the swivel angle; a pattern determination unit configured to determine a light distribution pattern such that the position of the vehicle detected by the vehicle position detector remains in the shielded area; and a pattern controller configured to control the lamp unit so as to form the determined light distribution pattern. The swivel angle setting unit selects and performs one of the first mode and the second mode.

According to the embodiment, one of a first mode in which a lamp unit is made to follow the travelling direction of a vehicle and a second mode in which a shielded area of a light distribution pattern is made to follow the position of a leading vehicle, is selectively performed. Thereby, it becomes possible to mount both of the first mode and the second mode, each of which has an advantage in accordance with a driving state of a driver's vehicle, in an automotive headlamp apparatus.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which:

FIGS. 5A to 5D are views illustrating examples of individual light distribution patterns, which are projected on a virtual vertical screen by a left lamp unit and a right lamp unit, and of synthesized light distribution patterns formed by superimposing the two individual light distribution patterns one on another;

DETAILED DESCRIPTION OF THE INVENTION

The invention will now be described by reference to the preferred embodiments. This does not intend to limit the scope of the present invention, but to exemplify the invention.

Embodiment 1

Figure 1:
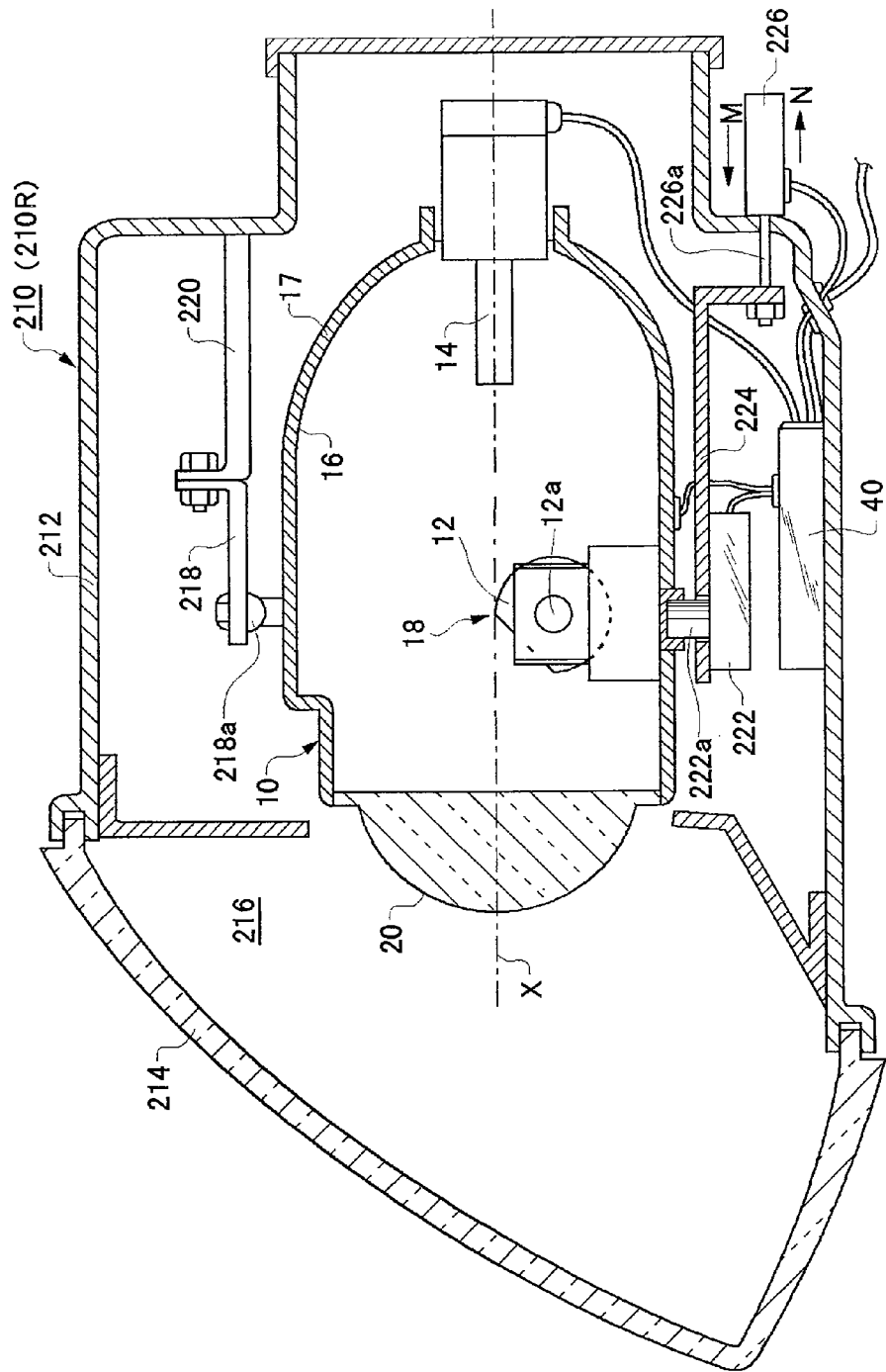
FIG. 1 is a schematic cross-sectional view illustrating the internal structure of a headlamp unit used in an automotive headlamp apparatus according to an embodiment of the present invention.

FIG. 1 is a schematic cross-sectional view illustrating the internal structure of a headlamp unit 210 used in an automotive headlamp apparatus according to an embodiment of the present invention. FIG. 1 illustrates the cross section of the headlamp unit 210 cut by a vertical plane including the light axis X of the lamp unit, when viewed from the left of the lamp unit. The headlamp units 210 respectively arranged on both ends in the vehicle width direction of a vehicle, are Adaptive Front-lighting Systems, and the structures thereof are substantially equal to each other. Accordingly, only the structure of the headlamp unit 210R arranged on the right side of a vehicle will be described on behalf of the two. The headlamp unit 210R has a lamp chamber 216 formed by a lamp body 212 having an opening in front of a vehicle and a translucent cover 214 covering the opening of the lamp body 212. In the lamp chamber 216, a lamp unit 10 emitting light in front of a vehicle is housed. On part of the lamp unit 10, a lamp bracket 218 having a pivot mechanism 218a is formed, the pivot mechanism 218a being to be the center of the swing of the lamp unit 10. The lamp bracket 218 is connected with a body bracket 220 fixed to the inner wall surface of the lamp body 212, by fastening members, such as screws. Accordingly, the lamp unit 10 is fixed to a predetermined position in the lamp chamber 216, and the posture of the lamp unit 10 can also be changed to, for example, forward leaning posture or backward leaning posture, etc., centered on the pivot mechanism 218a.

The rotational axis 222a of a swivel actuator 222 for structuring an Adaptive Front-lighting System (AFS) for curved roads, which illuminates the traveling direction when driving on a curved road, etc., is fixed to the underside of the lamp unit 10. The swivel actuator 222 swivels the lamp unit 10 in the traveling direction, centered on the pivot mechanism 218a, based on the data on a steering amount, which is provided from the vehicle side, on the shape data of the driving road, which is provided from a navigation system, and on the relationship of the relative position between a forward vehicle and the driver's vehicle, etc. As a result, the illumination range of the lamp unit 10 is oriented to the front of a curve of a curved road, not to the front of the vehicle, thereby enhancing the forward visibility of a driver. The swivel actuator 222 can be composed of, for example, a stepping motor. Alternatively, when a swivel angle is fixed, a solenoid, etc., can be used.

The swivel actuator 222 is fixed to a unit bracket 224. A leveling actuator 226 arranged outside the lamp body 212 is connected with the unit bracket 224. The leveling actuator 226 is composed of, for example, a motor that elongates and contracts a rod 226a in the direction of the arrows M and N. When the rod 226a has been elongated in the direction of the arrow M, the lamp unit 10 swings so as to take backward leaning posture, centered on the pivot mechanism 218a. In contrast, when the rod 226a has been contracted in the direction of the arrow N, the lamp unit 10 swings so as to take forward leaning posture, centered on the pivot mechanism 218a. When the lamp unit 10 takes backward leaning posture, the leveling adjustment for turning the light axis of the lamp unit 10 upwards can be performed. In contrast, when the lamp unit 10a takes forward leaning posture, the leveling adjustment for turning the light axis thereof downwards can be performed. The light axis thereof can be adjusted in accordance with the vehicle posture by performing such leveling adjustment. As a result, the reaching distance of the light emitted forward by the automotive headlamp apparatus 210 can be adjusted to an optimal distance.

This leveling adjustment can also be performed in accordance with the vehicle posture while driving. For example, a vehicle takes backward leaning posture when accelerated while driving, and in contrast, takes forward leaning posture when decelerated while driving. Accordingly, the illumination direction of the automotive headlamp apparatus 210 also fluctuates up and down, corresponding to a posture state of a vehicle, thereby causing the forward illumination distance to be large or small. Accordingly, the reaching distance of the forward illumination can be optimally adjusted, even while driving, by performing the leveling adjustment of the lamp unit 10 in real time based on the vehicle posture. This is sometimes referred to as "auto leveling".

Figure 2:
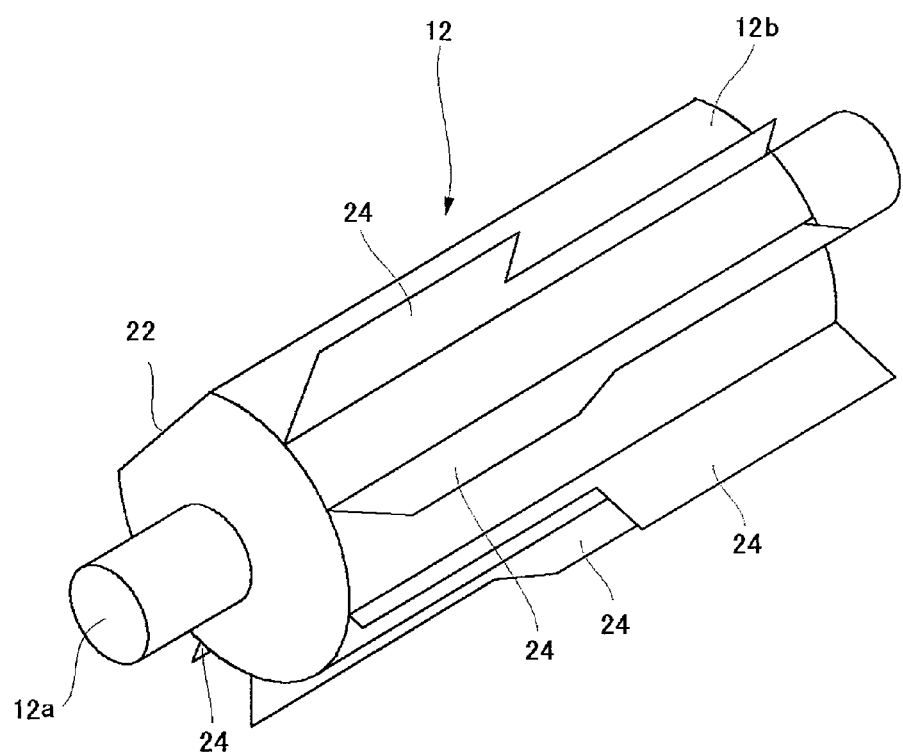
FIG. 2 is a schematic perspective view of a rotatable shade.

A headlamp apparatus controller 40 performing control of turning on/off of the lamp unit 10 and forming a light distribution pattern is arranged on the inner wall surface of the lamp chamber 216, for example, at a lower position of the lamp unit 10. In FIG. 2, a headlamp apparatus controller 40R for controlling the headlamp unit 210R is arranged. The headlamp apparatus controller 40R also performs control of the swivel actuator 222 and the leveling actuator 226, etc.

The lamp unit 10 can be provided with an aiming adjustment mechanism. An aiming pivot mechanism, which is to be the center of the swing when the aiming adjustment is performed, is arranged, for example, in the connection portion between the rod 226a of the leveling actuator 226 and the unit bracket 224. In addition, a pair of aiming adjustment screws, which move forward/backward in the vehicle longitudinal direction, are arranged in the connection portion between the body bracket 220 and the lamp bracket 218 so as to be spaced apart from each other in the vehicle width direction. For example, when the two aiming adjustment screws are moved forward, the lamp unit 10a takes forward leaning posture, centered on the aiming pivot mechanism, thereby the light axis being adjusted downward. Likewise, when the two aiming adjustment screws are moved backward, the lamp unit 10 takes backward leaning posture, centered on the aiming pivot mechanism, thereby the light axis being adjusted upward. Further, when the aiming adjustment screw on the left side in the vehicle width direction is moved forward, the lamp unit 10 takes clockwise swivel posture, centered on the aiming pivot mechanism, thereby the light axis being adjusted rightward. Further, when the aiming adjustment screw on the right side in the vehicle width direction is moved forward, the lamp unit 10 takes counter-clockwise swivel posture, centered on the aiming pivot mechanism, thereby the light axis being adjusted leftward. This aiming adjustment is performed when a vehicle is shipped or inspected, or when the automotive headlamp apparatus 200 is replaced with another. At the time, the automotive headlamp apparatus 210 is adjusted so as to have the prescribed posture specified in terms of design and the control of forming a light distribution pattern according to the present embodiment is performed on the basis of this posture.

The lamp unit 10 is composed of a shade mechanism 18 including a rotatable shade 12, a bulb 14 as a light source, a lamp housing 17 supporting a reflector 16 on the inner wall, and a projection lens 20. As the bulb 14, for example, an incandescent lamp, a halogen lamp, an electric discharge bulb, or an LED can be used. In the present embodiment, an example is described in which the bulb 14 is composed of a halogen lamp. The reflector 16 reflects the light emitted from the bulb 14. The light emitted from the bulb 14 and the light reflected by the reflector 16 are guided to the projection lens 20 through the rotatable shade 12, part of which the shade mechanism 18 is composed of.

FIG. 2 is a schematic perspective view of the rotatable shade 12. The rotatable shade 12 is a cylindrically-shaped member rotated by a shade rotating motor, centered on the rotational axis 12a. Further, the rotatable shade 12 has a notched portion 22 in which part of the rotatable shade 12 is notched in the axial direction, and has a plurality of plate-shaped shade plates 24 on the outer circumferential surface 12b other than the notched portion 22. The rotatable shade 12 can move any one of the notched portion 22 and the shade plates 24 into a position on the back focal plane including the back focal point of the projection lens 20 in accordance with its rotating angle. And accordingly, a light distribution pattern complying with the shape of the ridge line portion of the shade plate 24 locating on the light axis X, is formed in accordance with a rotating angle of the rotatable shade 12. For example, with part of the light emitted from the bulb 14 being shielded by moving any one of the shade plates 24 of the rotatable shade 12 onto the light X, a light distribution pattern for low beam or a light distribution pattern including, in part of it, a feature of a light distribution pattern for low beam, is formed. Alternatively, with the light emitted from the bulb 14 not being shielded by moving the notched portion 22 onto the light axis X, a light distribution pattern for high beam is formed.

The rotatable shade 12 can be rotated by, for example, a motor drive, and a shade plate 24 or the notched portion 22, which are used for forming a desired light distribution pattern, is moved onto the light axis X by controlling a rotation amount of a motor. Alternatively, the notched portion 22 of the outer circumferential surface 12b of the rotatable shade 12 may be omitted such that the rotatable shade 12 has only a shielding function. When a light distribution pattern for high beam is formed, the rotatable shade 12 is made to retract from the position on the light axis X by driving, for example, a solenoid, etc. With such a structure, even if a fail occurs in, for example, a motor for rotating the rotatable shade 12, a light distribution pattern for low beam or a light distribution pattern similar to that is fixed. That is, a fail-safe function can be attained by surely avoiding that the rotatable shade 12 is fixed to the posture by which a light distribution pattern for high beam is formed.

The projection lens 20 is arranged on the light axis X extending in the vehicle longitudinal direction, and the bulb 14 is arranged on the back side of the back focal plane of the projection lens 20. The projection lens 20 is composed of a plano-convex aspheric lens, the front surface of which is convex-shaped and the back surface of which is flat-shaped, and the projection lens 20 projects, as an inverted image, the image of the light source that is formed on the back focal plane onto a virtual vertical screen in front of the lamp unit 10.

Figure 3:
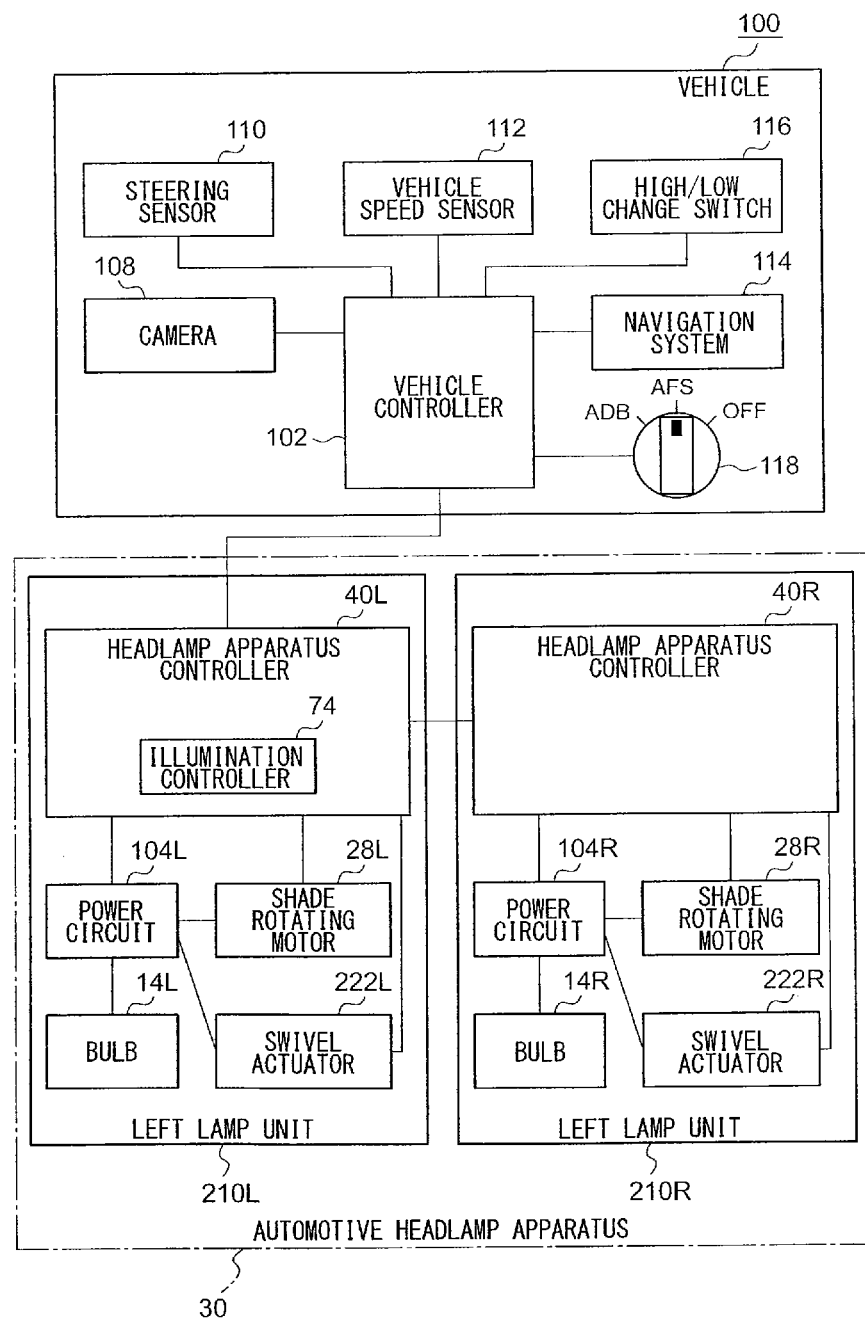
FIG. 3 is a functional block view illustrating the structures of the automotive headlamp apparatus including the headlamp unit, and of a vehicle.

FIG. 3 is a functional block view illustrating the structures of the automotive headlamp apparatus 30 including the headlamp unit 210 structured as stated above, and of a vehicle 100. The automotive headlamp apparatus 30 includes a left headlamp unit 210L and a right headlamp unit 210R. When it is necessary to particularly distinguish components, included in each of the left headlamp unit 210L and the right headlamp unit 210R and having functions similar to each other, from each other in the descriptions, components on the left headlamp unit 210L side will be denoted with "L" and those on the right headlamp unit 210R side with "R".

The left headlamp unit 210L is controlled by a headlamp apparatus controller 40L, and the right headlamp unit 210R by a headlamp apparatus controller 40R. The automotive headlamp apparatus 30 according to the present embodiment forms a single whole light distribution pattern by superimposing individual light distribution patterns one on another, the individual light distribution patterns including an individual light distribution pattern formed by a lamp unit in the left headlamp unit 210L (hereinafter, referred to as a "left lamp unit 10L") and that formed by a lamp unit in the right headlamp unit 210R (hereinafter, referred to as a "a right lamp unit 10R"). Accordingly, for example, the headlamp apparatus controller 40L includes an illumination controller 74 as an integrated controller of the left lamp unit 10L and the right lamp unit 10R. The illumination controller 74 manages control states of the headlamp apparatus controllers 40L and 40R such that the left lamp unit 10L and the right lamp unit 10R respectively form individual light distribution patterns. In addition, the illumination controller 74 may be included in the headlamp apparatus controller 40R.

The headlamp apparatus controller 40L, the control state of which is determined by the illumination controller 74, controls a shade rotating motor 28L in the left headlamp unit 210L to determine the shape of an individual light distribution pattern. Further, the headlamp apparatus controller 40L controls a power circuit 104L of the left headlamp unit 210L to control turning on the bulb 14L, or controls a swivel actuator 222L to perform swivel control. Likewise, the headlamp apparatus controller 40R, the control state of which is determined by the illumination controller 74, controls a shade rotating motor 28R in the right headlamp unit 210R to determine the shape of an individual light distribution pattern. Further, the headlamp apparatus controller 40R controls a power circuit 104R of the right headlamp unit 210R to control turning on the bulb 14R, or controls a swivel actuator 222R to perform swivel control.

In order to detect a target object, such as a leading vehicle, an oncoming vehicle, and a pedestrian, etc., a camera 108, for example, a stereo camera etc., is connected with a vehicle controller 102 in the vehicle 100 as a means of recognizing the target object. A means for detecting a target object in front of a vehicle can be appropriately changed and other detection means, such as a millimeter-wave radar and an infrared radar, may be adopted instead of the camera 108, wherein the illumination to the target object by the automotive headlamp apparatus 30 should be suppressed. Such detection means may be used in combination. The camera 108 may be dedicated for control of the automotive headlamp apparatus 30 or may be shared by other system.

The vehicle controller 102 can also obtain information from a steering sensor 110 and a vehicle speed sensor 112, etc., which are usually mounted in the vehicle 100. Further, the vehicle controller 102 can also obtain information on the shape or form of a road, and that on the installation of a road sign, etc., from a navigation system 114. By obtaining these information beforehand, the illumination controller 74 can smoothly form a light distribution pattern suitable for the driving road.

In the present embodiment, a mode change switch 118 for selecting any one of the following three modes is included: an AFS (Adaptive Front-lighting System) mode for swiveling the lamp unit such that a light distribution pattern follows the travelling direction of a vehicle while driving on a curved road; an ADB (Adaptive Driving Beam) mode for swiveling the lamp unit so as to form a light distribution pattern in which the emission of light to the position where a leading vehicle or a pedestrian is present, is excluded; and an off-mode in which each control of the two modes is not performed. Also, a high/low change switch 116 is included in which, when the off-mode is selected, a driver can manually change a light distribution pattern for high beam and that for low beam to each other. The illumination controller 74 determines swivel angles of both the lamp units and light distribution patterns formed by the respective lamp units based on the selection of these switches and the vehicle's situations.

An example of the mode change switch 118 includes a dial-type switch in which each of the three modes can be changed to; however, a switch having any other shape can be adopted as long as each of the aforementioned three modes can be selected. An operation, occurring when each mode is selected, will be described in detail in FIG. 7 or later.

Figure 4:
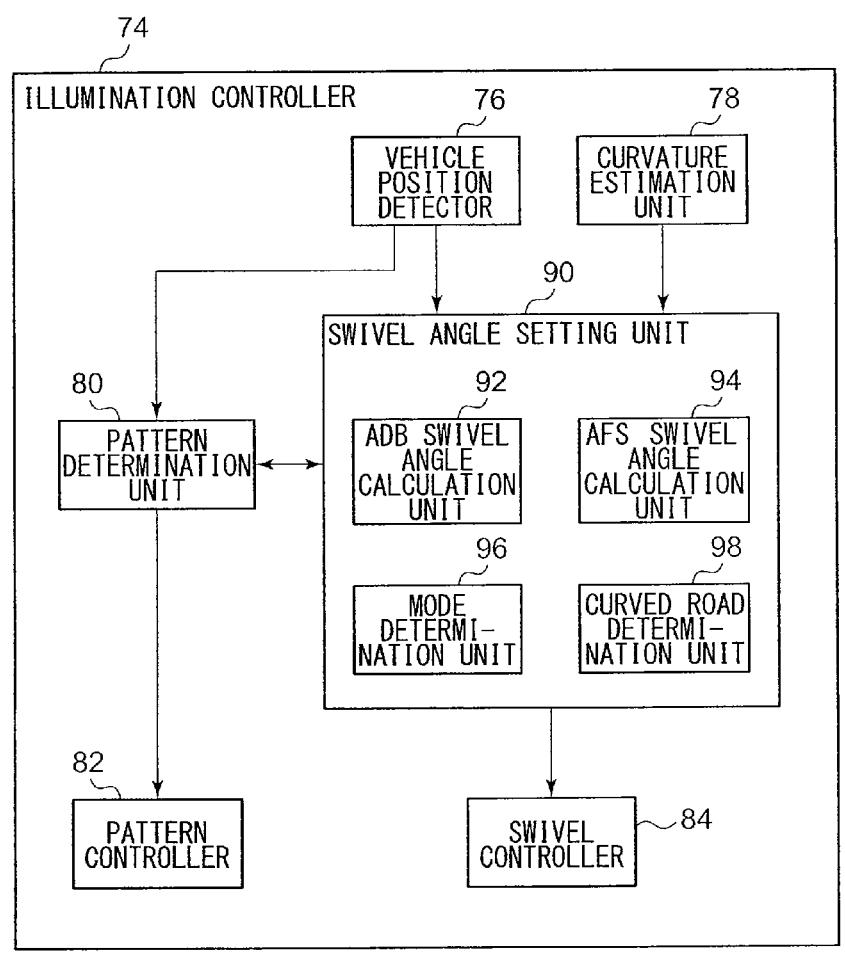
FIG. 4 is a detailed functional block view of an illumination controller.

FIG. 4 is a further detailed functional block view of the illumination controller 74. Each block illustrated herein can be realized with devices including a CPU and a memory of a computer in terms of hardware, and realized with a computer program loaded onto a memory in terms of software; however, functional blocks realized by cooperation of these are illustrated herein. Accordingly, it will be understood by a person skilled in the art that these functional blocks can be realized in various forms according to combinations of hardware and software.

After receiving image data photographed by the camera 108 from the vehicle controller 102, a vehicle position detector 76 can detect the position of a leading vehicle by retrieving a feature point indicating a vehicle in the image data. The position information of the detected leading vehicle is sent to a pattern determination unit 80 and a swivel angle setting unit 90.

The pattern determination unit 80 determines light distribution patterns of the left lamp unit 10L and the right lamp unit 10R so as to illuminate the front of a vehicle with an optimal light distribution pattern in accordance with presence/absence of the leading vehicle detected by the vehicle position detector 76 and a change in the position thereof.

The pattern controller 82 drives the shade rotating motors 28L and 28R such that the shade plate 24, which forms the light distribution pattern determined by the pattern determination unit 80, is moved onto the light axis X.

For example, when a leading vehicle or an oncoming vehicle is detected in front of the driver's vehicle, the pattern determination unit 80 determines that glare should be prevented by forming a synthesized light distribution pattern for low beam. Then, the pattern controller 82 drives the shade rotating motor 28L in the left lamp unit 10L to form, by a rotatable shade 12L, a light distribution pattern for low beam in which a predetermined amount of the light from a bulb 14L is shielded. Likewise, the pattern controller 82 drives the shade rotating motor 28L in the right lamp unit 10R to form, by a rotatable shade 12R, a light distribution pattern for low beam in which a predetermined amount of the light from a bulb 14R is shielded.

When a leading vehicle or an oncoming vehicle is not detected in front of the driver's vehicle, the pattern determination unit 80 determines that the visibility of a driver should be enhanced by forming a light distribution pattern for high beam in which the illumination range is enlarged. Then, the pattern controller 82 forms, by the rotatable shades 12L and 12R in the left lamp unit 10L and the right lamp unit 10R, individual light distribution patterns for high beam in which the light is not shielded. When a leading vehicle is not present and an oncoming vehicle or a pedestrian is present in an area of left-hand traffic prescribed by traffic regulations, the pattern determination unit 80 determines that a synthesized light distribution pattern for left high beam should be formed, the synthesized light distribution pattern for left high beam being one of the light distribution patterns for particular high beam in which only the drivers' lane side is illuminated with high beam. When only a leading vehicle is present and an oncoming vehicle or a pedestrian is not present, the pattern determination unit 80 determines that a synthesized light distribution pattern for right high beam should be formed, the synthesized light distribution pattern for right high beam being one of particular light distribution patterns for high beam in which only the opposite lane side is illuminated with high beam. Synthesized light distribution patterns determined by the pattern determination unit 80 and formed by the pattern controller 82 will be described later with reference to FIG. 5.

A curvature estimation unit 78 receives a steering angle detected by the steering sensor 110 and a vehicle speed detected by the vehicle speed sensor 112, so that the curvature of the road on which the vehicle is driving is estimated. In another method, the curvature estimation unit 78 may receive, from the navigation system 114, information on the shape of the road on which the vehicle is driving, so that the curvature of the road on which the vehicle is driving is calculated. The estimated curvature is sent to a swivel angle setting unit 90.

The swivel angle setting unit 90 sets actual swivel angles of the right and left lamp units based on the selection of the switches 116 and 118 and the vehicle situations. The swivel angle setting unit 90 includes an ADB swivel angle calculation unit 92, an AFS swivel angle calculation unit 94, a mode determination unit 96, and a curved road determination unit 98.

When a leading vehicle is detected by the vehicle position detector 76, the ADB swivel angle calculation unit 92 calculates each of swivel angles $\beta$ of the left lamp unit 10L and the right lamp unit 10R (hereinafter, each of which is referred to as an "ADB swivel angle $\beta$") such that a non-illuminated area (hereinafter, also referred to as a "shielded area") of a light distribution pattern is moved so as to follow a change in the position of the leading vehicle. When a leading vehicle is not detected, a swivel angle $\beta$ of each of the left lamp unit 10L and the right lamp unit 10R becomes zero, at the swivel angle $\beta$ a leading vehicle being followed. Because the ADB swivel angle calculation unit is a function corresponding to the well-known ADB, detailed descriptions with respect to a method of calculating an angle will be omitted.

The AFS swivel angle calculation unit 94 calculates each of swivel angles $\alpha$ of the left lamp unit 10L and the right lamp unit 10R (hereinafter, referred to as an "AFS swivel angle $\alpha$") based on the curvature estimated by the curvature estimation unit 78, so that a gaze point where the driver's vehicle will reach in several seconds becomes bright. Because a curved road following swivel angle determination unit is a function corresponding to the well-known AFS, detailed descriptions with respect to a method of calculating an angle will be omitted.

In the present specification, the point where the light axis X of the lamp unit faces the front is made to be 0° and swivel of the lamp unit to the right or left is defined by plus or minus of the swivel angles $\beta$ and $\alpha$; however, it may be possible that the maximum swivel angle to either right direction or left direction is defined as 0° and a swivel angle is represented only by a plus value.

The mode determination unit 96 determines the mode selected by the mode change switch 118. The curved road determination unit 98 determines whether the road on which a vehicle is driving is a straight road or a curved road based on the curvature estimated by the curvature estimation unit 78.

The swivel angle setting unit 90 determines whether either an AFS swivel angle α or an ADB swivel angle β is to be adopted based on the selected mode and the vehicle situations. As an example, when it is determined that the road is a curved road by the curved road determination unit 98, the swivel angle setting unit 90 determines that the right and left lamp units are to be swiveled by an AFS swivel angle α; and when it is determined that the road is a straight road, the swivel angle setting unit 90 determines that the right and left lamp units are to be swiveled by an ADB swivel angle β.

Complying with the determination by the swivel angle setting unit 90, the swivel controller 84 controls the swivel actuators 222L and 222R such that the right and left lamp units 10L and 10R are swiveled to either the AFS swivel angle α or the ADB swivel angle β.

FIGS. 5A to 5D illustrate examples of individual light distribution patterns, which are projected on a virtual vertical screen by the left lamp unit 10L and the right lamp unit 10R, and of synthesized light distribution patterns formed by superimposing the two individual light distributions one on another.

In the present embodiment, it is assumed that the shade plates 24 for forming the individual light distribution patterns LoL and HiL, illustrated in the views, by the left lamp unit 10L and for forming the individual light distribution patterns LoR and HiR, illustrated in the views, by the right lamp unit 10R, are held in the rotatable shades 12L and 12R. Among the individual light distribution patterns, each of the light distribution patterns HiR and HiL has a cut-off line extending in the approximately vertical direction above the horizontal line, and each of the two is an individual light distribution pattern for high beam in which, when the light axis faces the front of a vehicle, a shielded area is present on the right side or left side from the vertical line. Each of the light distribution patterns LoL and LoR is a light distribution pattern for low beam having a shape in which the right portion extending horizontally below the horizontal line crossing the light axis on the right side in the vehicle width direction, and the left portion extending horizontally at a position slightly above the right portion on the left side in the vehicle width direction, are connected with each other by the central portion tilted upward to the left. By combining these individual light distribution patterns, the automotive headlamp apparatus 30 can form the four synthesized light distribution patterns illustrated in FIGS. 5A to 5D.

FIG. 5A is a synthesized light distribution pattern for "low beam" normally available in areas of left-hand traffic prescribed by the traffic regulations. In this case, the left lamp unit 10L and the right lamp unit 10R form individual light distribution patterns for low beam LoL and LoR by the rotatable shades 12L and 12R, the two individual light distribution patterns having shapes substantially the same as each other. Accordingly, the synthesized light distribution patterns for low beam, formed by superimposing both the individual light distribution patters one on another, has the same shapes as those. In FIG. 5A, in order to illustrate that the individual light distribution patterns for low beam LoL and LoR are superimposed one on another, the sizes of the two are intentionally made different from each other; however, the sizes my be completely the same as each other. In this case, because the individual light distribution pattern for low beam LoL, formed by the left lamp unit 10L, and that for low beam LoR, formed by the right lamp unit 10R, are overlapped each other, the illuminance of the synthesized light distribution pattern for low beam LoC becomes the sum of both illuminance of the two individual light distribution patterns. The synthesized light distribution pattern for low beam LoC becomes a normal light distribution patter for low beam in view of not providing glare to an oncoming vehicle, a leading vehicle, or a pedestrian when keeping to the left.

FIG. 5B is a light distribution pattern for illuminating only the driver's lane side with high beam when keeping to the left, that is, a so-called synthesized light distribution pattern for "left high beam", which is classified into the light distribution patterns for particular high beam. In this case, the individual light distribution pattern for low beam LoR is formed by the rotatable shade 12R and the individual light distribution pattern for high beam HiL is formed by the rotatable shade 12L. When both are superimposed one on another, the synthesized light distribution pattern for left high beam HiCL can be formed, in which the illumination range on the left side in front of the driver's vehicle is illuminated with high beam and that on the right side in front thereof is illuminated with low beam. It is desirable that the synthesized light distribution pattern for left high beam HiCL is used when a leading vehicle or a pedestrian is not present in the driver's lane and when an oncoming vehicle or a pedestrian is present in the opposite lane, thereby allowing for glare not to be provided to an oncoming vehicle or a pedestrian on the opposite lane side when keeping to the left, and allowing for the visibility to be enhanced by illuminating only the driver's lane side with high beam.

FIG. 5C is a light distribution pattern for illuminating only the opposite lane side with high beam when keeping to the left, that is, a so-called synthesized light distribution pattern for "right high beam", which is classified into the light distribution patterns for particular high beam. In this case, the individual light distribution pattern for low beam LoL is formed by the rotatable shade 12L and the individual light distribution pattern for high beam HiR is formed by the rotatable shade 12R. When both are superimposed one on another, the synthesized light distribution pattern for right high beam HiCR can be formed, in which the illumination range on the right side in front of the driver's lane is illuminated with high beam and that on the left side in front thereof is illuminated with low beam. It is desirable to use the synthesized light distribution pattern for right high beam HiCR when a leading vehicle or a pedestrian is present in the driver's lane and when an oncoming vehicle or a pedestrian is not present in the opposite lane, thereby allowing for glare not to be provided to a leading vehicle or a pedestrian on the driver's lane side when keeping to the left, and allowing for the visibility to be enhanced by illuminating only the opposite lane side with high beam.

In each of the synthesized light distribution pattern for left high beam HiCL and that for right high beam HiCR, only the area where both the individual light distribution patterns are superimposed one on another, that is, only the area corresponding to the synthesized light distribution pattern for low beam, has the illuminance equal to the sum of both illuminance of the two individual light distribution patterns, thereby becoming bright. The additional area for right high beam or left high beam, which is formed additionally above the area corresponding to the synthesized light distribution pattern for low beam, has the illuminance obtained when the left lamp unit 10L or the right lamp unit 10R is singly emitting light.

FIG. 5D is a synthesized light distribution pattern for "high beam". In this case, the individual light distribution patterns for high beam FL and FR are formed in the left lamp unit 10L and the right lamp unit 10R by the rotatable shades 12L and 12R, respectively. When both are superimposed one on another, the synthesized light distribution pattern for high beam HiC can be formed, in which a wide range in front of the driver's vehicle is illuminated. In this case, the left lamp unit 10L and the right lamp unit 10R respectively form the individual light distribution patterns FL and FR by the rotatable shades 12L and 12R, the individual light distribution patterns FL and FR having the shapes substantially the same as each other. Accordingly, the synthesized light distribution pattern for high beam HiC, formed by superimposing both the individual light distribution patterns one on another, has the same shape as those. In FIG. 5D, it is illustrated that both the individual light distribution patterns for high beam FL and FR are superimposed one on another. In this case, because the individual light distribution pattern for high beam FL, formed by the left lamp unit 10L, and that FR, formed by the right lamp unit 10R, are overlapped each other, the illuminance of the synthesized light distribution pattern for high beam HiC become the sum of both illuminance of the two individual light distribution patterns.

Synthesized light distribution patterns formed by the left lamp unit 10L and the right lamp unit 10R are not limited to those stated above. Other than those, it may be possible that an individual light distribution pattern for single high beam HiL is formed by the rotatable shade 12L and that for single high beam HiR is formed by the rotatable shade 12R. In this case, a synthesized light distribution pattern for "split" can be formed, in which an approximately concave-letter-shaped light distribution pattern is formed, as a whole, by swiveling the left lamp unit 10L and the right lamp unit 10R in the direction where both are spaced apart from each other and only an area where a leading vehicle is present above the horizontal line of the light distribution pattern is made a shielded area.

Further, the pattern determination unit 80 may select a so-called synthesized light distribution pattern for "V-beam" having a V-letter-shaped shielded area at the approximately center above the horizontal line, by making the left lamp unit 10L form an individual light distribution pattern for low beam having a central portion tilted upward to the left and by making the right lamp unit 10R form an individual light distribution pattern for low beam having a central portion tilted upward to the right. A synthesized light distribution pattern made from these individual light distribution patterns can be realized by installing a shade plate having a shape, corresponding to an individual light distribution pattern formed by each lamp unit, in the rotatable shade.

In the synthesized light distribution pattern for split, only the area where the respective individual light distribution patterns are overlapped each other has the illuminance equal to the sum of both illuminance of the two individual light distribution patterns, thereby becoming bright. The additional area formed additionally above the area corresponding to the light distribution pattern for low beam has the illuminance obtained when the left lamp unit 10L or the right lamp unit 10R is singly emitting light.

As stated above, a swivel function can be realized in the present embodiment by driving the swivel actuators 222L and 222R with respect to the left lamp unit 10L and the right lamp unit 10R. In the synthesized light distribution patterns for single high beam HiCL and HiCR illustrated in FIGS. 5B and 5C, by using this, a shielded area can be moved by making the cut-off line in the vertical direction follow right and left movement of a leading vehicle. Further, in the synthesized light distribution pattern for split, the central shielded area can be moved so as to follow right and left movement of a leading vehicle. Such control can be realized by cooperation of the swivel angle setting unit 90, the pattern determination unit 80, and the pattern controller 82.

Figure 6A:
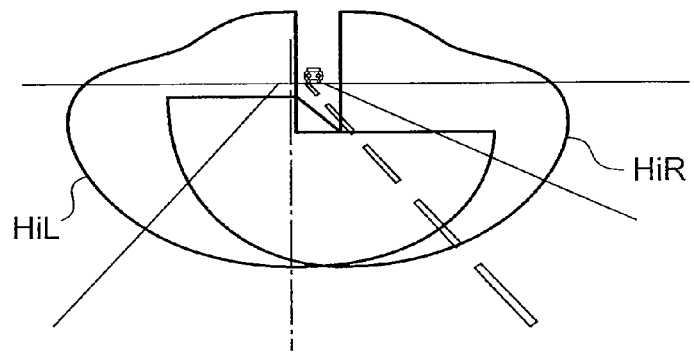
FIGS. 6A to 6C are views illustrating variation examples of the light distribution patterns during an ADB mode operation.
Figure 6B:
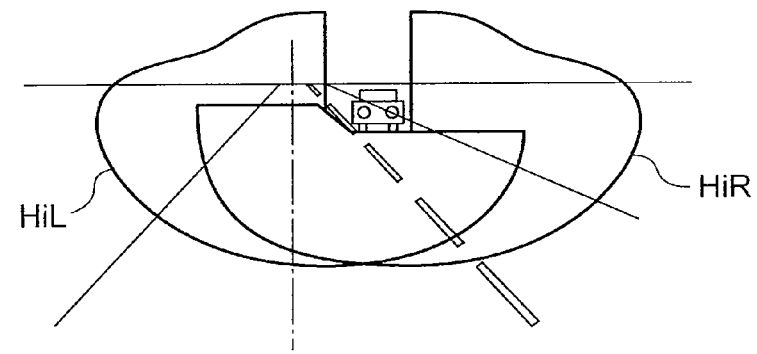
Figure 6C:
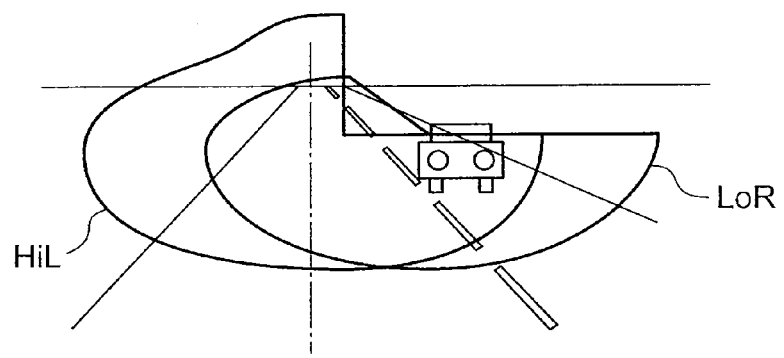

FIGS. 6A to 6C are views illustrating variation examples of the light distribution patterns during the ADB mode operation.

FIG. 6A illustrates a synthesized light distribution pattern when an oncoming vehicle is detected in the distance by the vehicle position detector 76 while driving on a straight road. When the ADB mode is selected, the pattern determination unit 80 makes the left lamp unit 10L form the individual light distribution pattern for single high beam HiL and makes the right lamp unit 10R form the individual light distribution pattern for single high beam HiR. As a result, the synthesized light distribution pattern for split, having a shielded area that matches the width of a leading vehicle, is formed.

FIG. 6B illustrates a synthesized light distribution pattern obtained when an oncoming vehicle approaches the driver's vehicle. As a result that the right and left lamp units are swiveled by a swivel angle β, which has been calculated by the ADB swivel angle calculation unit 92, it is illustrated that the individual light distribution patterns for single high beam HiL and HiR have been moved right so as to follow the change in the position of a leading vehicle.

FIG. 6C illustrates a synthesized light distribution pattern obtained when an oncoming vehicle further approaches the driver's vehicle. When the distance between an oncoming vehicle and the driver's vehicle is small, glare may be provided to the oncoming vehicle when only the individual light distribution pattern for single high beam HiR has been swiveled. Accordingly, the pattern determination unit 80 makes the left lamp unit 10L form the individual light distribution pattern for single high beam HiL and makes the right lamp unit 10R form the individual light distribution pattern for low beam LoR. As a result, a synthesized light distribution pattern for left high beam can be formed in which the illumination area on the left side in front of the driver's vehicle is illuminated with high beam and that on the right side is illuminated with low beam.

As stated above, the illumination controller 74 according to the present embodiment determines swivel angles of the right and left lamp units, and light distribution patterns to be formed by the respective lamp units, based on the selection of the switches 116 and 118 and the vehicle situations. Hereinafter, examples of the operation of the illumination controller 74 will be sequentially described.

Example 1

Figure 7:
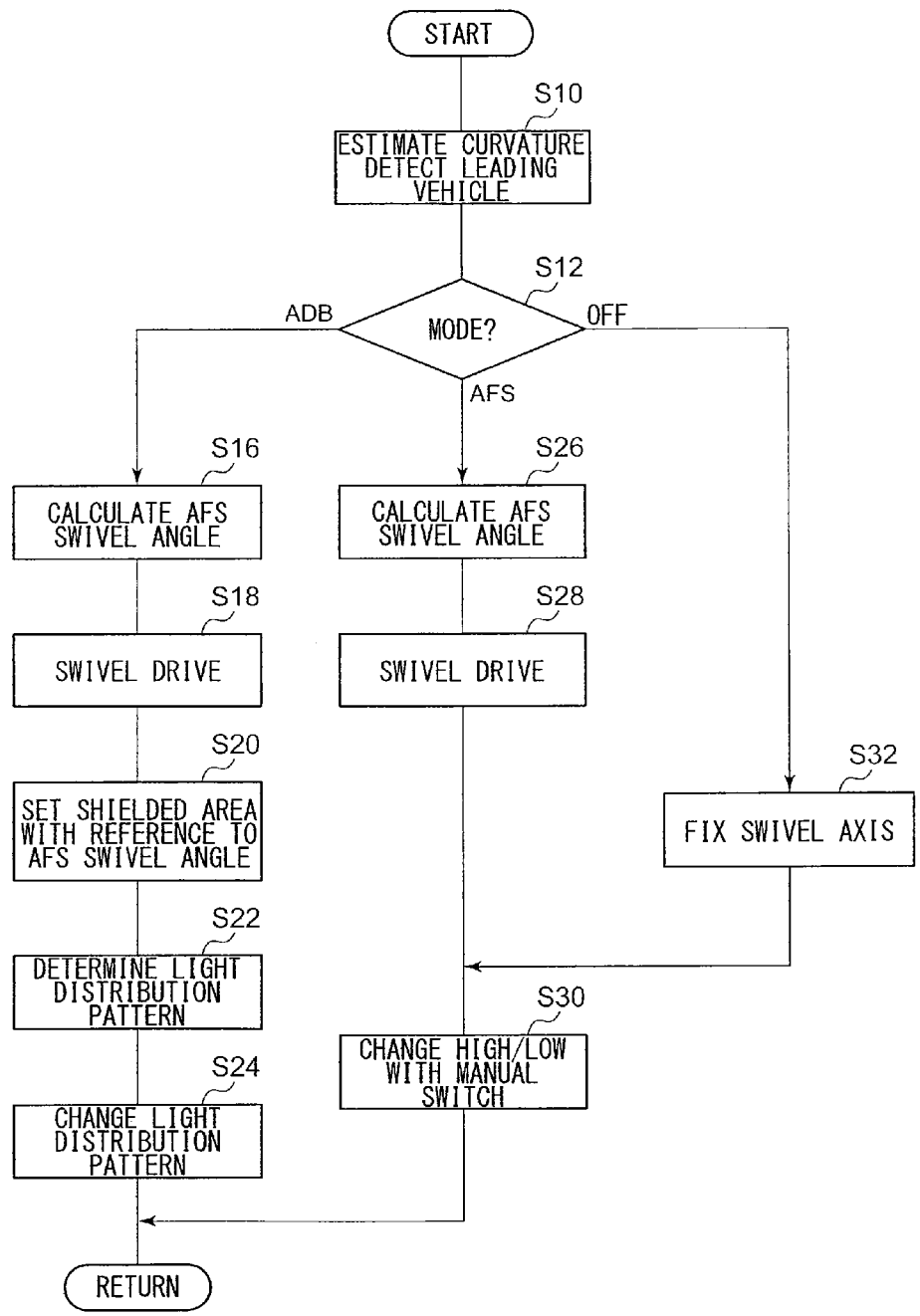
FIG. 7 is a flowchart illustrating processing of Example 1.

FIG. 7 is a flowchart illustrating processing of Example 1. The curvature estimation unit 78 at first obtains the steering angle and the vehicle speed of a vehicle to estimate the curvature of the road on which the vehicle is driving, and the vehicle position detector 76 detects a leading vehicle by processing an image of the front of the vehicle (S10).

The mode determination unit 96 determines which mode is selected with reference to the mode change switch 118 (S12). When the ADB mode is selected, the AFS swivel angle calculation unit 94 calculates an AFS swivel angle α based on the curvature of the road (S16), and the swivel controller 84 drives the right and left lamp units by the swivel angle α (S18). Subsequently, the pattern determination unit 80 sets a shielded area in consideration of the position of a leading vehicle, in a state where the lamp units are swiveled by the swivel angle α (S20), so that a light distribution pattern suitable for the shielded area is determined (S22). The pattern controller 82 controls the right and left lamp units so as to change to the determined light distribution pattern (S24).

When the AFS mode is selected in S12, the AFS swivel angle calculation unit 94 calculates an AFS swivel angle α based on the curvature of a road (S26), and the swivel controller 84 swivels the right and left lamp units by the swivel angle βα (S28). Subsequently, the pattern controller 82 changes a light distribution pattern for low beam and that for high beam to each other in accordance with the high/low change switch 116 (S30). That is, in this case, swivel drive of a lamp unit and control of changing light distribution patters are not performed. When the off-mode is selected in S12, the mode determination unit 96 issues a command to the swivel controller 84 that the swivel axis is fixed in the direction where the light axis of the lamp unit faces the front of the vehicle (S32). The pattern controller 82 changes a synthesized light distribution pattern for high beam and that for low beam to each other in accordance with the high/low change switch 116.

As stated above, in Example 1, when a user selects the ADB mode, a light distribution pattern having a shielded area in consideration of the position of a leading vehicle is selected after swiveling the lamp unit so as to follow the travelling direction. When the AFS mode is selected, change of a light distribution pattern for high beam and that for low beam to each other is left to determination of a driver after swiveling the lamp unit so as to follow the travelling direction. That is, in Example 1, swivel of the lamp unit, for always following the travelling direction of the driver's vehicle, is performed without performing swivel thereof, for following the position of a leading vehicle. Thereby, change in the direction of a light distribution does not become complicated, and hence there is no need to provide a sense of discomfort to a driver.

Example 2

Figure 8:
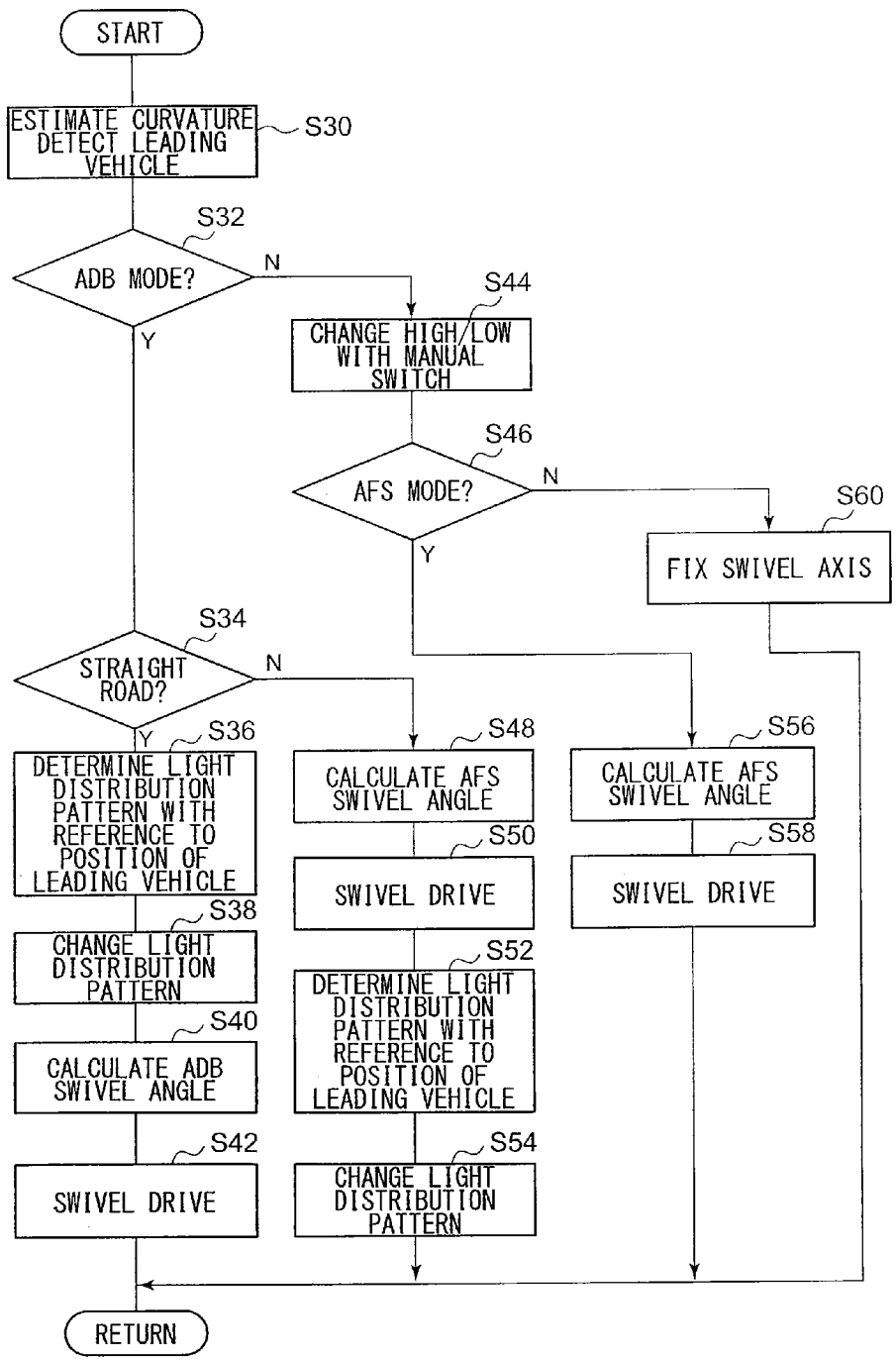
FIG. 8 is a flowchart illustrating processing of Example 2.

FIG. 8 is a flowchart illustrating processing of Example 2. The curvature estimation unit 78 at first obtains the steering angle and the vehicle speed of a vehicle to estimate the curvature of the road on which the vehicle is driving, and the vehicle position detector 76 detects a leading vehicle by processing an image of the front of the vehicle (S30).

The mode determination unit 96 determines whether the ADB mode is selected with reference to the mode change switch 118 (S32). When the ADB mode is selected (S32/Y), the curved road determination unit 98 determines whether the road is a straight road (S34). When the road is a straight road (S34/Y), the pattern determination unit 80 determines a suitable light distribution pattern in consideration of the position of a leading vehicle (S36), and then the pattern controller 82 controls the right and left lamp units so as to change to the determined light distribution pattern (S38). Thereafter, the ADB swivel angle calculation unit 92 calculates an ADB swivel angle β in accordance with the position of the leading vehicle (S40), and the swivel controller 84 swivels the right and left lamp units by the swivel angle β (S42).

When the road is a curved road in S34 (S34/N), the AFS swivel angle calculation unit 94 calculates an AFS swivel angle α based on the curvature of the road (S48), and the swivel controller 84 swivels the right and left lamp units by the swivel angle α (S50). Thereafter, the pattern determination unit 80 determines a suitable light distribution pattern in consideration of the position of a leading vehicle (S52), and the pattern controller 82 controls the right and left lamp units so as to change to the determined light distribution pattern (S54).

When the ADB mode is not selected in S32 (S32/N), the pattern controller 82 changes a synthesized light distribution pattern for high beam and that for low beam to each other in accordance with the high/low change switch 116 (S44). Subsequently, the mode determination unit 96 determines whether the AFS mode is selected with reference to the mode change switch 118 (S46). When the AFS mode is selected (S46/Y), the AFS swivel angle calculation unit 94 calculates an AFS swivel angle α based on the curvature of the road (S56), and the swivel controller 84 swivels the right and left lamp units by the swivel angle α (S58). When the AFS mode is not selected, that is, the off-mode is selected in S46 (S46/N), the mode determination unit 96 issues a command to the swivel controller 84 that the swivel axis is fixed in the direction where the light axis of the lamp unit faces the front of the vehicle (S60).

As stated above, in Example 2, when a user selects the ADB mode, the control is performed in which a shielded area in a light distribution pattern is moved so as to follow the position of a leading vehicle when driving on a straight road, and when driving on a curved road, a light distribution pattern in consideration of a leading vehicle is determined after swiveling the lamp unit so as to follow the travelling direction. When the AFS mode is selected, the lamp unit is swiveled so as to follow the travelling direction; however, change of a light distribution pattern for high beam and that for low beam to each other is left to determination of a driver. As stated above, by selecting a swivel function to be used in accordance with the driving road while the ADB mode is being selected, change in the direction of a light distribution pattern does not become complicated, and hence there is no need to provide a sense of discomfort to a driver.

Example 3

Figure 9:
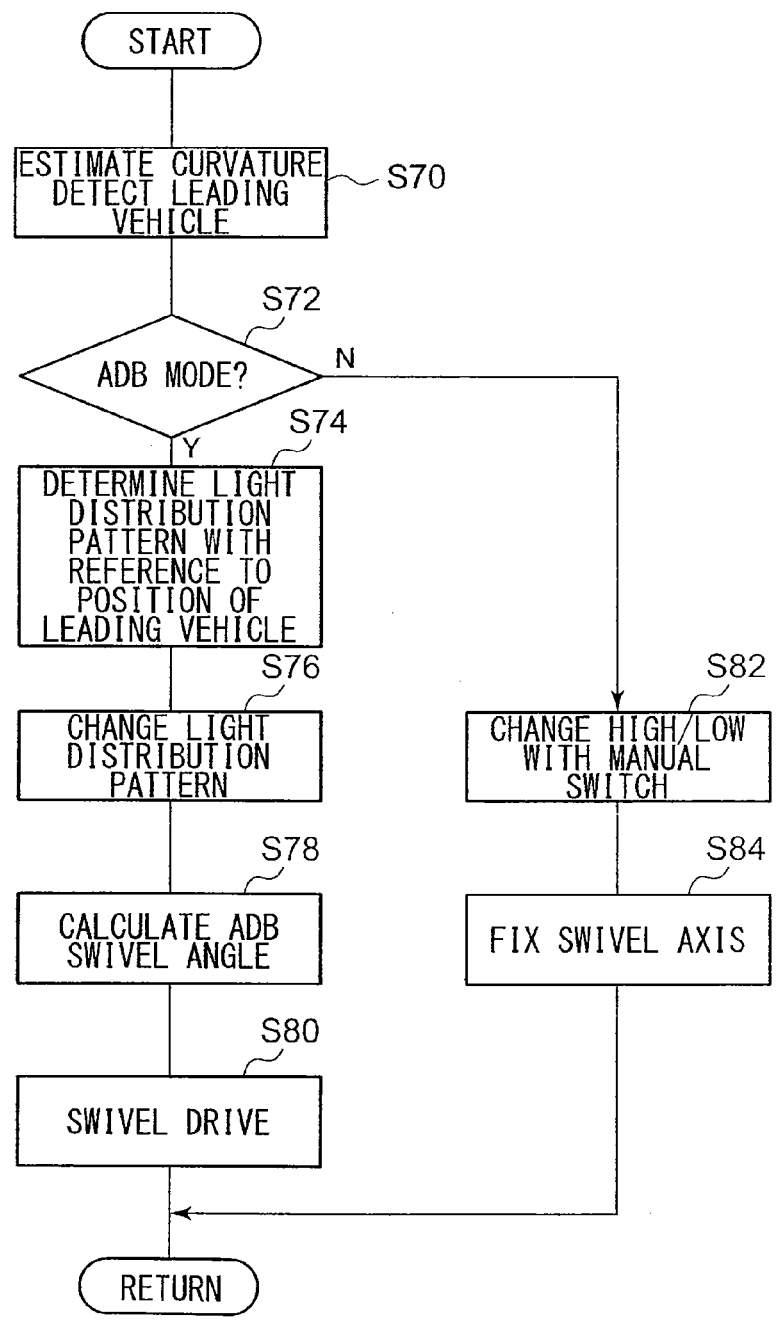
FIG. 9 is a flowchart illustrating processing of Example 3.

FIG. 9 is a flowchart illustrating processing of Example 3. The curvature estimation unit 78 at first obtains the steering angle and the vehicle speed to estimate the curvature of the road on which the vehicle is driving, and the vehicle position detector 76 detects a leading vehicle by processing an image of the front of the vehicle (S70).

The mode determination unit 96 determines whether the ADB mode is selected with reference to the mode change switch 118 (S72). When the ADB mode is selected (S72/Y), the pattern determination unit 80 determines a suitable light distribution pattern in consideration of the position of a leading vehicle (S74), and the pattern controller 82 controls the right and left lamp units so as to change to the determined light distribution pattern (S76). Thereafter, the ADB swivel angle calculation unit 92 calculates an ADB swivel angle □ in accordance with the position of a leading vehicle (S78), and the swivel controller 84 swivels the right and left lamp units by the swivel angle β (S80).

When the ADB mode is not selected in S72 (S72/N), the pattern controller 82 changes a light distribution pattern for high beam and that for low beam to each other in accordance with the high/low change switch 116 (S82), and the mode determination unit 96 issues a command to the swivel controller 84 that the swivel axis is fixed in the direction where the light axis of the lamp unit faces the front of the vehicle (S84).

As stated above, in example 3, when a user selects the ADB mode, the control is performed in which a shielded area in a light distribution pattern is moved so as to follow the position of a leading vehicle; however, when other modes are selected, change of a light distribution pattern for high beam and that for low beam to each other is left to determination of a driver. That is, the swivel function of the lamp unit is used only for following a leading vehicle, and the swivel of the lamp unit, for following the travelling direction, is not performed at all even when driving on a curved road. By disregarding the AFS mode as stated above, change in the direction of a light distribution does not become complicated, and hence there is no need to provide a sense of discomfort to a driver.

Example 4

Figure 10:
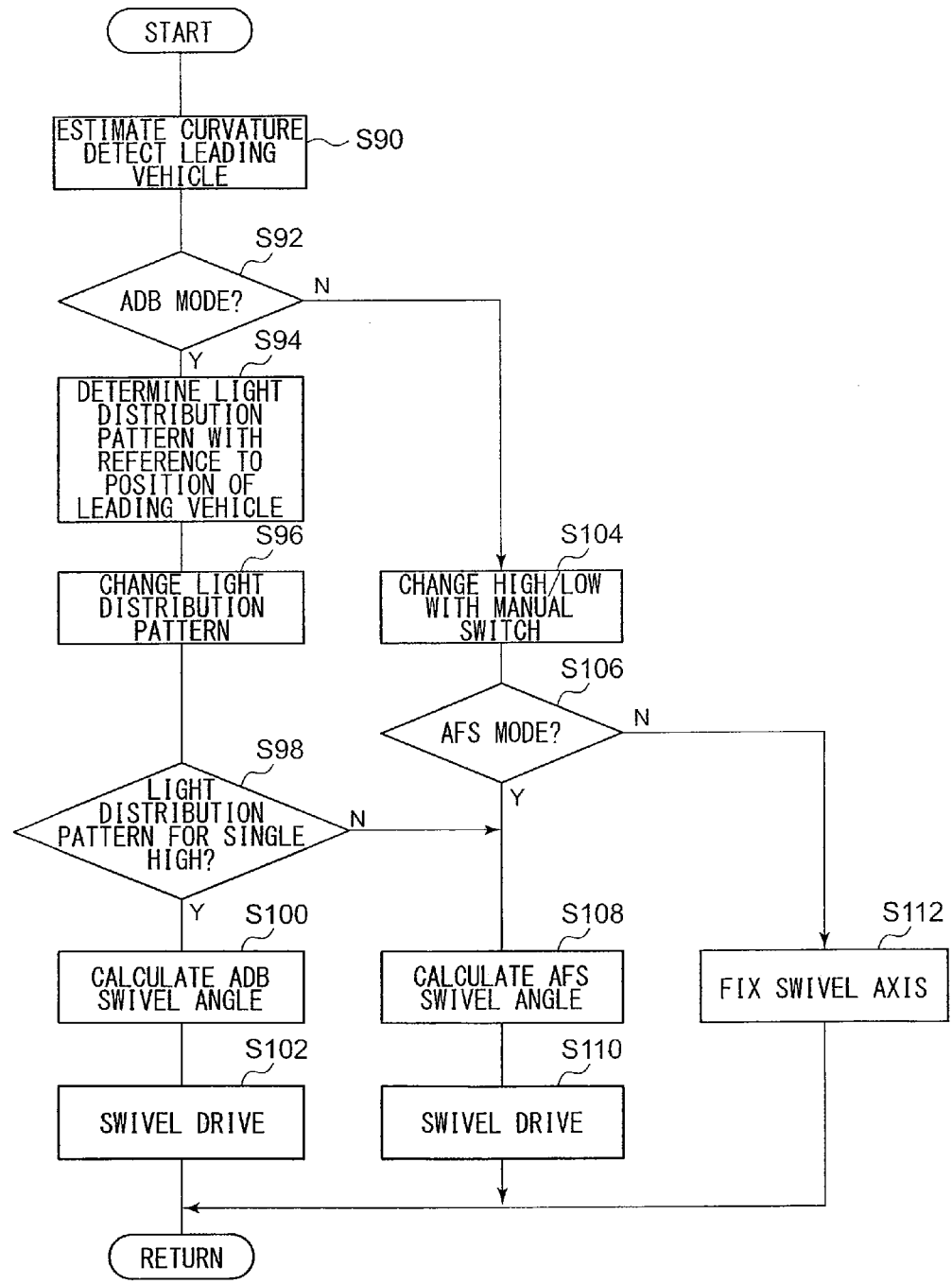
FIG. 10 is a flowchart illustrating processing of Example 4.

FIG. 10 is a flowchart illustrates processing of Example 4. The curvature estimation unit 78 at first obtains the steering angle and the vehicle speed of a vehicle to estimate the curvature of the road on which the vehicle is driving, and the vehicle position detector 76 detects a leading vehicle by processing an image of the front of the vehicle (S90).

The mode determination unit 96 determines whether the ADB mode is selected with reference to the mode change switch 118 (S92). When the ADB mode is selected (S92/Y), the pattern determination unit 80 determines a suitable light distribution pattern in consideration of the position of a leading vehicle (S94), and the pattern controller 82 controls the right and left lamp units so as to change to the determined light distribution pattern (S96).

Subsequently, the swivel angle setting unit 90 determines whether the light distribution pattern, which has been determined by the pattern determination unit 80, is a synthesized light distribution pattern for single high beam (S98). When the determined light distribution pattern is a synthesized light distribution pattern for single high beam (S98/Y), the ADB swivel angle calculation unit 92 calculates an ADB swivel angle β in accordance with the position of a leading vehicle (S100), and the swivel controller 84 swivels the right and left lamp units by the swivel angle β (S102).

When the ADB mode is not selected in S92 (S92/N), the pattern controller 82 changes a synthesized light distribution pattern for high beam and that for low beam to each other in accordance with the high/low change switch 116 (S104). Subsequently, the mode determination unit 96 determines whether the AFS mode is selected with reference to the mode change switch 118 (S106). When the AFS mode is selected (S106/Y), the AFS swivel angle calculation unit 94 calculates an AFS swivel angle α based on the curvature of a road (S108), and the swivel controller 84 swivels the right and left lamp units by the swivel angle α (S110). Also, when the determined light distribution pattern is one other than a synthesized light distribution pattern for single high beam in S98 (S98/N), similar processing is performed. When a mode other than the AFS mode, namely, the off-mode is selected in S106 (S106/N), the mode determination unit 96 issues a command to the swivel controller 84 that the swivel axis is fixed in the direction where the light axis of the lamp unit faces the front of the vehicle (S112).

As stated above, in Example 4, when a user selects the ADB mode, the lamp unit is swiveled so as to follow a leading vehicle if a synthesized light distribution pattern for single high beam is selected, and when a light distribution pattern other than that is selected or when a user selects the AFS mode, the lamp unit is swiveled so as to follow the travelling direction.

Example 5

Figure 11:
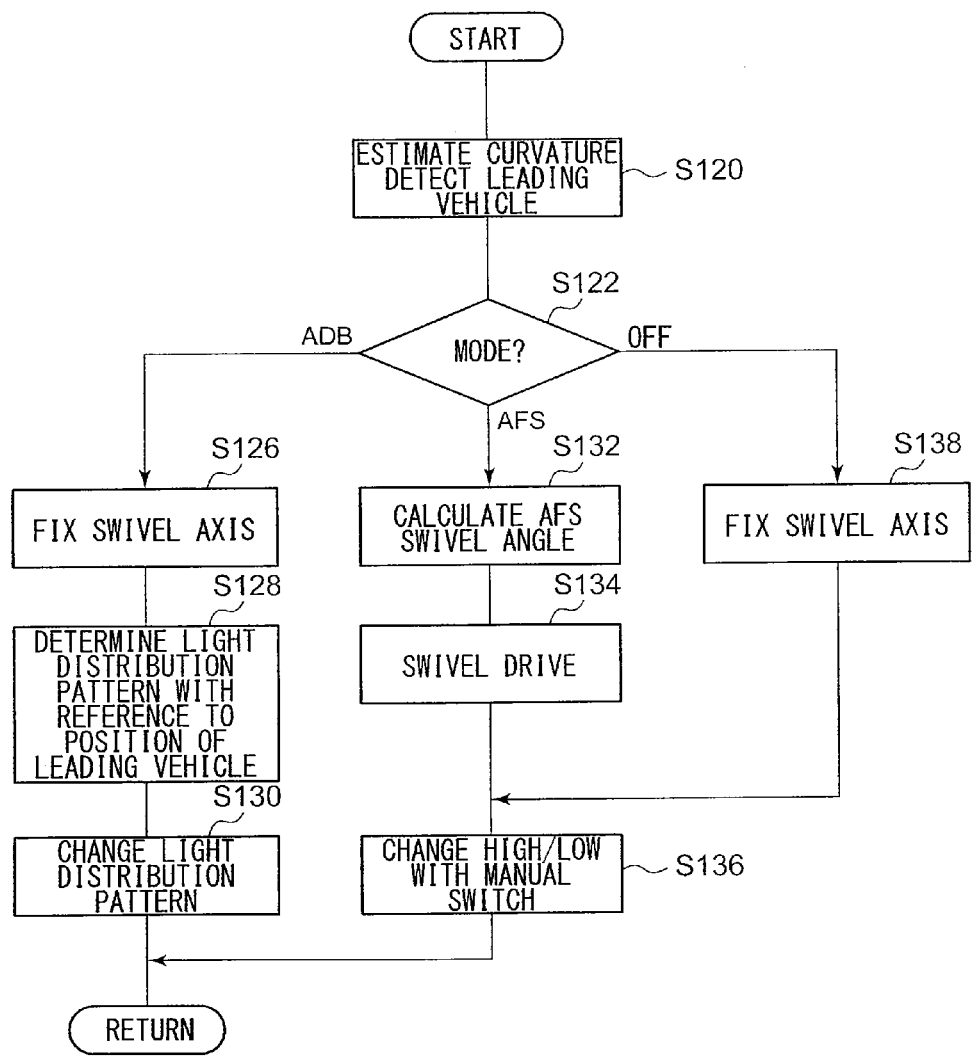
FIG. 11 is a flowchart illustrating processing of Example 5.

FIG. 11 is a flowchart illustrating processing of Example 5. The curvature estimation unit 78 at first obtains the steering angle and the vehicle speed of a vehicle to estimate the curvature of the road on which the vehicle is driving, and the vehicle position detector 76 detects a leading vehicle by processing an image of the front of the vehicle (S120).

The mode determination unit 96 determines which mode is selected with reference to the mode change switch 118 (S122). When the ADB mode is selected, the mode determination unit 96 issues a command to the swivel controller 84 that the swivel axis is fixed in the direction where the light axis of the lamp unit faces the front of the vehicle (S126). The pattern determination unit 80 determines a suitable light distribution pattern in consideration of the position of a leading vehicle (S128), and the pattern controller 82 controls the right and left lamp units so as to change to the determined light distribution pattern (S130).

When the AFS mode is selected in S122, the AFS swivel angle calculation unit 94 calculates an AFS swivel angle α based on the curvature of the road (S132), and the swivel controller 84 swivels the right and left lamp units by the swivel angle α (S134). Thereafter, the pattern controller 82 changes a synthesized light distribution pattern for high beam and that for low beam to each other in accordance with the high/low change switch 116 (S136). When the off-mode is selected in S122, the mode determination unit 96 issues a command to the swivel controller 84 that the swivel axis is fixed in the direction where the light axis of the lamp unit faces the front of the vehicle (S138), and thereafter the pattern controller 82 changes a synthesized light distribution pattern for high beam and that for low beam to each other in accordance with the high/low change switch 116 (S136).

As stated above, in Example 5, when a user selects the ADB mode, the change to a light distribution pattern in consideration of the position of a leading vehicle is only performed without performing the swivel of the lamp unit. When the AFS mode is selected, the lamp unit is swiveled so as to follow a leading vehicle; however, the change of a light distribution pattern for high beam and that for low beam to each other is left to determination of a driver. That is, the swivel function and the change of a light distribution pattern are not performed in cooperation with each other in this Example. Thereby, change in the direction of a light distribution does not become complicated, and hence there is no need to provide a sensor of discomfort to a driver.

As stated above, an automotive headlamp apparatus according to each of the aforementioned embodiments operates by applying, in accordance with the position of the change switch, either the ADB mode for swiveling the lamp unit in accordance with an ADB swivel angle so as to form a light distribution pattern in which the illumination to the position of a leading vehicle or a pedestrian is excluded, or the AFS mode in which the lamp unit is swiveled so as to follow the travelling direction of the driver's vehicle. Accordingly, it becomes possible to mount both of the ADB mode and the AFS mode in the automotive headlamp apparatus. Further, in some embodiments, it can be prevented that change in the direction of a light distribution pattern becomes complicated, by applying only either mode in a limited manner. Furthermore, in some embodiments, a sense of discomfort of a driver can be reduced by preventing an unnatural light distribution.

In each of the aforementioned embodiments, it sometimes occurs that either of the right and left lamp units does not operate while forming an individual light distribution pattern for single high beam (hereinafter, such a state is referred to as a "single high malfunction"). As causes of the single high malfunction, a malfunction in the headlamp apparatus controller 40, a malfunction in the power circuit 104, and a structural malfunction in the lamp unit 10, etc., can be considered. If swivel drive of the lamp unit is continued in the state, part of the high beam area in the travelling direction is always being lighted, thereby glare may be provided to another vehicle or a pedestrian.

Therefore, when detecting a single high malfunction with any means, it may be possible to prohibit swivel drive. It will be described taking FIG. 7 as an example. Before referring to the mode change switch, it is determined whether a non-illustrated malfunction confirmation unit detects a single high malfunction. Detection of a malfunction is performed by a well-known method. When a single high malfunction has been detected, a driver is reported by a voice message or turning on a lamp, etc., that a single high malfunction has occurred, and the swivel axis of the lamp unit is fixed. The driver to whom the single high malfunction has been reported uses a light distribution pattern by changing the synthesized light distribution pattern for high beam to that for low beam with a manual switch. With such a manipulation, it becomes possible that glare, which may be provided to a leading vehicle or a pedestrian by continuing drive in a state where a single high malfunction is occurring, is avoided.

In the aforementioned embodiments, it has been described that a mode change switch is provided, the mode change switch having a structure in which the ADB mode, the AFS mode, or the off-mode is changed from one to another. However, it may be possible to mount in a vehicle two independent switches consisting of an ADB switch (not illustrated) for changing on/off of the ADB mode to each other and an AFS switch (not illustrated) for changing on/off of the AFS mode to each other. In this case, a swivel control method may be determined as described below in accordance with the states of both the switches.

(Pattern 1)
ADB switch:on, AFS switch:on
A swivel drive is changed in accordance with an AFS swivel angle, and then a light distribution pattern is changed (in the same way as S16 to S24 in FIG. 7).

ADB switch:on, AFS switch:off
A light distribution pattern is changed in accordance with the position of a leading vehicle, and then a swivel drive is changed in accordance with an ADB swivel angle (in the same way as S74 to S80 in FIG. 9).

ADB switch:off, AFS switch:on
A light distribution pattern is not changed, and a swivel drive is changed in accordance with an AFS swivel angle (in the same way as S26 to S30 in Example 1).

(Pattern 2)
ADB switch:on, AFS switch:on
A swivel drive is changed in accordance with an AFS swivel angle, and then a light distribution pattern is changed (in the same way as S16 to S24 in example 1).

ADB switch:on, AFS switch:off
A swivel drive is not performed, and only a light distribution pattern is changed (in the same way as S126 to S130 in FIG. 11).

ADB switch:off, AFS switch:on
A light distribution pattern is not changed, and a swivel drive is changed in accordance with an AFS swivel angle (in the same way as S26 to S30 in Example 1).

(Pattern 3)
ADB switch:on, AFS switch:on
A light distribution pattern is changed in accordance with the position of a leading vehicle, and then a swivel drive is changed in accordance with an ADB swivel angle (in the same way as S74 to S80 in FIG. 9).

ADB switch:on, AFS switch:off
A swivel drive is not performed, and only a light distribution pattern is changed (in the same way as S126 to S130 in FIG. 11).

ADB switch:off, AFS switch:on
A light distribution pattern is not changed, and a swivel drive is changed in accordance with an AFS swivel angle (in the same way as S26 to S30 in Example 1).

In an embodiment in which both of the aforementioned ADB switch and the AFS switch are mounted, when the ADB switch is changed from on to off by a driver, it is desirable that the illumination controller immediately changes the right and left lamp units so as to emit light distribution patterns for low beam. Thereby, the light distribution pattern can be quickly changed to a light distribution pattern for low beam in response to, for example, the passing from another vehicle, etc.

Figure 12:
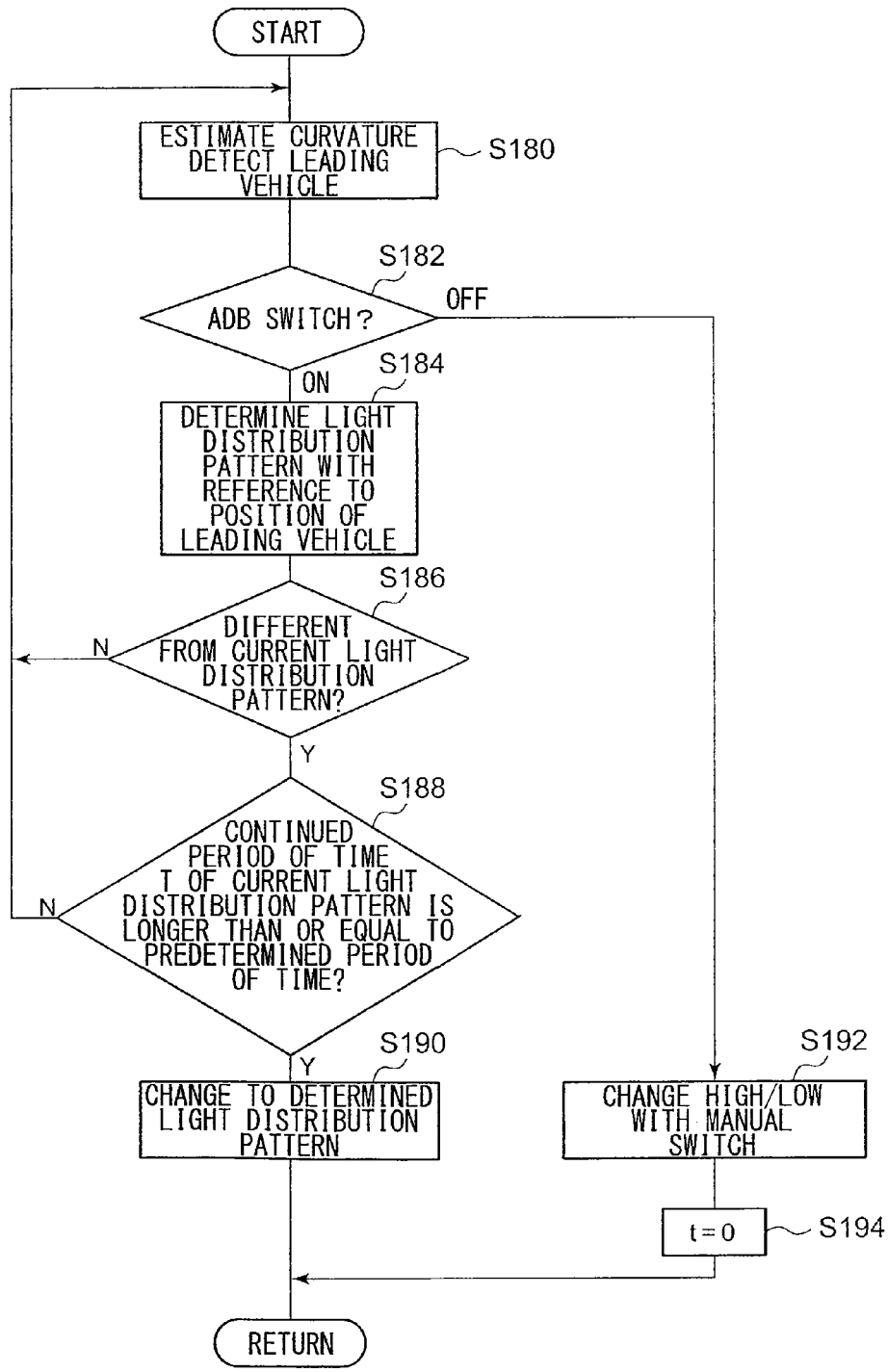
FIG. 12 is a flowchart illustrating processing in which a light distribution pattern is switched to another after a lapse of a predetermined period of time.

In contrast, when the ADB switch is changed from off to on, it is desirable that the light distribution pattern is changed after a predetermined lapse of time. FIG. 12 is a flowchart illustrating this processing.

The curvature estimation unit 78 at first obtains the steering angle and the vehicle speed of a vehicle to estimate the curvature of the road on which the vehicle is driving, and the vehicle position detector 76 detects a leading vehicle by processing an image of the front of the vehicle (S180). The mode determination unit 96 refers to the ADB switch (S182). When the switch is turned on, the pattern determination unit 80 determines a suitable light distribution pattern in consideration of the position of a leading vehicle (S184). Further, the pattern determination unit 80 determines whether the light distribution pattern determined this time is different from that currently being performed. When the light distribution pattern is not different (S186/N), the step returns to S180. When the light distribution pattern is different (S186/Y), the pattern determination unit 80 determines whether the continued period of time t of the light distribution pattern currently being performed is longer than or equal to a predetermined period of time (S188). The predetermined period of time is one during which a sense of discomfort is less provided to a driver even if a light distribution pattern is changed after the ADB switch has been turned on, and is desirably set to a period of time within a range of 0.5 to 3 seconds. When the continued period of time of the current light distribution pattern is below the predetermined period of time (S188/N), the step returns to S180, postponing the change to the determined light distribution pattern. When the continued period of time of the current light distribution pattern is longer than or equal to the predetermined period of time (S188/Y), the pattern controller 82 controls the right and left lamp units such that the determined light distribution pattern is changed to (S190). When the ADB switch is turned off in S182, the pattern controller 82 changes the synthesized light distribution pattern for high beam to that for low beam in accordance with the high/low change switch 116 (S192), and resets the continued period of time t of the light distribution pattern (S194).

As stated above, because a period of time necessary for a change of a light distribution pattern when the ADB switch is changed from on to off, is different from that when the ADB switch is changed from off to on, a driver can be easily recognized the change to the ADB mode. Further, by delaying a change of a light distribution pattern by a predetermined period of time, a sense of discomfort provided to a driver by the change of a light distribution pattern can be reduced.

The present invention should not be limited to the aforementioned embodiments, and various modifications, such as design modifications, can be made with respect to the above embodiments by combining each embodiment or based on the knowledge of those skilled in the art. Such combined or modified embodiments should also fall in the scope of the invention. New embodiments created by combining the aforementioned embodiments with each other and by combining each of the aforementioned embodiments and each of the following variations would have both effects of the embodiments and the variations to be combined.

What is claimed is:

1. An automotive headlamp apparatus comprising:
   a pair of lamp units, that are arranged on both sides in a vehicle width direction of a vehicle so as to be spaced apart from each other, each of the pair of lamp units having a first shade for forming a light distribution pattern for low beam and a second shade for forming a light distribution pattern for shielded high beam, the second shade having a horizontal line and a cut-off line extending in the approximately vertical direction above the horizontal line for illuminating the corresponding side of the arranged position of the pair lamp units in the vehicle width direction and shielding the opposite side, each of the pair of lamp units having shield-switching mechanisms;
   a lamp drive unit configured to respectively swivel the pair of lamp units to approximately the right and left directions of the vehicle;
   a vehicle position detector configured to detect a position of a forward vehicle;
   a swivel angle setting unit configured to receive the position of the forward vehicle from the vehicle position detector and to set a swivel angle of the pair of lamp units according to a first mode in which the light distribution pattern follows the travelling direction of the vehicle in response to road curvature information, and to a second mode in which a swivel angle of the lamp unit is set such that a shielded area created in a light distribution pattern follows the forward vehicle based on the position of the forward vehicle detected by the vehicle position detector;
   a swivel controller configured to control the lamp drive unit in accordance with the swivel angle;
   a pattern determination unit configured to determine a light distribution pattern such that the position of the forward vehicle detected by the vehicle position detector remains in the shielded area; and
   a pattern controller configured to control the lamp unit so as to form the determined light distribution pattern.

2. The automotive headlamp apparatus according to claim 1, wherein the swivel angle setting unit sets the swivel angle of the pair of lamp units according to the first mode when it is determined that the road is a curved road based on the road curvature information, and sets the swivel angle of the pair of lamp units according to the second mode when it is determined that the road is a straight road.

3. The automotive headlamp apparatus according to claim 1, wherein the swivel angle setting unit sets the swivel angle of the pair of lamp units according to the second mode when a light distribution pattern for shielded high beam is selected by the pattern determination unit, and sets the swivel angle of the pair of lamp units according to the first mode when other light distribution patterns are selected.

4. The automotive headlamp apparatus according to claim 1 further comprising a mode change unit by which a driver can determine either the first mode or the second mode should be performed in the swivel angle setting unit.

5. The automotive headlamp apparatus according to claim 1 further comprising a selection indicating unit by which a driver selects whether the second mode should be performed in the swivel angle setting unit, wherein, when the second mode is selected, the swivel angle controller initiates the swivel of the lamp unit after a predetermined lapse of time from the selection.

6. The automotive headlamp apparatus according to claim 1, wherein the swivel angle setting unit further has a third mode in which the swivel axis is fixed in the direction where the light axis of the lamp unit faces the front of the vehicle.

7. The automotive headlamp apparatus according to claim 1, wherein, when the second mode is selected by a driver, the swivel angle setting unit prohibits swivel drive of the lamp unit.

8. The automotive headlamp apparatus according to claim 1, wherein, when the lamp unit does not operate while forming a light distribution pattern for shielded high beam, the swivel angle setting unit prohibits swivel drive of the lamp unit.

9. The automotive headlamp apparatus according to claim 1 further comprising a first switch to indicate whether the first mode should be performed in the swivel angle setting unit, and comprising a second switch to indicate whether the second mode should be performed in the swivel angle setting unit.

10. The automotive headlamp apparatus according to claim 4, wherein, when the second mode is selected by a driver, the swivel controller swivels the lamp unit by a swivel angle that has been set under the first mode, and thereafter swivels the lamp unit by a swivel angle that has been set under the second mode.

11. A controller for an automotive headlamp apparatus, comprising a swivel angle setting unit configured to receive a position of a forward vehicle from a vehicle position detector and to set a swivel angle of lamp units according to a first mode in which a light distribution pattern created by the lamp units follows the travelling direction of a vehicle containing the headlamp apparatus, and a second mode for swiveling the lamp units such that a shielded area created in the light distribution pattern follows the forward vehicle based on the position of the forward vehicle detected by the vehicle position detector,
   wherein the swivel angle setting unit switches the first mode and the second mode in response to road curvature information.

12. The controller according to claim 11, wherein the swivel angle setting unit sets the swivel angle of the lamp units according to the first mode when it is determined that the road is a curved road based on the road curvature information, and sets the swivel angle of the lamp units according to the second mode when it is determined that the road is a straight road based on the road curvature information.

13. The controller according to claim 11, wherein the automotive headlamp apparatus, comprising a pair of lamp units each of which has a first shade for forming a light distribution pattern for low beam and a second shade for forming a light distribution pattern for shielded high beam, the second shade having a horizontal line and having a cut-off line extending in the approximately vertical direction above the horizontal line for illuminating the corresponding side of the arranged position of the pair of lamp units in the vehicle containing the headlamp apparatus width direction and shielding the opposite side, each of the pair of lamp units having a shield-switching mechanism.

14. The controller according to claim 11, wherein the automotive headlamp apparatus can perform the second pattern with the lamp unit swiveled such that the light distribution pattern follow the travelling direction of the vehicle containing the headlamp apparatus.

15. The controller according to claim 14, wherein, when it is determined that the road is a curved road based on the road curvature information, the swivel angle setting unit sets the swivel angle of the lamp units according to the second mode after swiveling the lamp units such that a light distribution pattern follows the travelling direction of the vehicle containing the headlamp apparatus, and when it is determined that the road is a straight road based on the road curvature information, the swivel angle setting unit sets the swivel angle of the lamp units according to the first mode after swiveling the lamp units such that a shielded area created in the light distribution pattern follows the forward vehicle.

16. A controller for an automotive headlamp apparatus, comprising a swivel angle setting unit configured to receive a position of a forward vehicle from a vehicle position detector and to set a swivel angle of lamp units according to a first mode in which a light distribution pattern created by the lamp units follows the travelling direction of a vehicle containing the headlamp apparatus, and according to a second mode in which a shielded area created in the light distribution pattern follows the forward vehicle based on the position of the forward vehicle detected by the vehicle position detector, wherein the swivel angle setting unit sets the swivel angle of the lamp units according to the second mode when the automotive headlamp radiates a light distribution pattern for shielded high beam, and sets the swivel angle of the lamp units according to the first mode when the automotive headlamp radiates other light distribution pattern.

17. The controller according to claim 16, wherein the automotive headlamp apparatus, comprising a pair of lamp units each of which has a first shade for forming a light distribution pattern for low beam and a second shade for forming a light distribution pattern for shielded high beam, the second shade having a horizontal line and having a cut-off line extending in the approximately vertical direction above the horizontal line for illuminating the corresponding side of the arranged position of the pair of lamp units in the vehicle containing the headlamp apparatus width direction and shielding the opposite side, each of the pair of lamp units having a shield-switch mechanism.

18. The controller according to claim 16, wherein the automotive headlamp apparatus can perform the second pattern with the lamp unit swiveled such that the light distribution pattern follow the travelling direction of the vehicle.

19. The controller according to claim 17, wherein, when it is determined that the road is a curved road based on the road curvature information, the swivel angle setting unit sets the swivel angle of the pair of lamp units according to the second mode after swiveling the pair of lamp units such that a light distribution pattern follows the travelling direction of the vehicle containing the headlamp apparatus, and when it is determined that the road is a straight road based on the road curvature information, the controller causes the automotive headlamp to perform the first mode after swiveling the pair of lamp units such that a shielded area created in the light distribution pattern follows the forward vehicle.

20. A controller for an automotive headlamp apparatus, comprising a swivel angle setting unit configured to receive a position of a forward vehicle from a vehicle position detector and to set a swivel angle of lamp units such that a shielded area created in the light distribution pattern follows the forward vehicle based on the position of the forward vehicle detected by the vehicle position detector.

* * * * *

UNITED STATES PATENT AND TRADEMARK OFFICE
CERTIFICATE OF CORRECTION

PATENT NO.         : 9,956,901 B2
APPLICATION NO.    : 12/845408
DATED              : May 1, 2018
INVENTOR(S)        : Yutaka Nakanishi, Manabu Sasa and Atsushi Yamazaki Page 1 of 1

It is certified that error appears in the above-identified patent and that said Letters Patent is hereby corrected as shown below:

The assignee address was recorded incorrectly as Shizuoka (JP) and should read as follows:
(73) Assignee: KOITO MANUFACTURING CO., LTD., Tokyo (JP)

Signed and Sealed this
Seventh Day of May, 2019

Andrei Iancu
*Director of the United States Patent and Trademark Office*